United States Patent [19]

Fishwick

[11] 4,109,802

[45] Aug. 29, 1978

[54] DEPALLETIZING APPARATUS

[75] Inventor: Alan James Fishwick, Bolton, England

[73] Assignee: Metal Box Limited, Reading, England

[21] Appl. No.: 778,538

[22] Filed: Mar. 17, 1977

[51] Int. Cl.² .............................................. B65G 59/02
[52] U.S. Cl. ............................... 214/8.5 F; 214/8.5 G
[58] Field of Search ...................... 214/309, 310, 1 BB, 214/1 BT, 1 R, 8.5 R, 8.5 A, 8.5 C, 8.5 F, 8.5 G, 8.5 H, 622

[56] References Cited

U.S. PATENT DOCUMENTS

| 4,032,021 | 6/1977 | Mabey et al. | 214/8.5 F |
| 4,032,022 | 6/1977 | Smith | 214/8.5 C |

*Primary Examiner*—Frank E. Werner
*Attorney, Agent, or Firm*—Sughrue, Rothwell, Mion, Zinn and Macpeak

[57] ABSTRACT

The invention relates to depalletizing apparatus of the kind which comprises a transfer head which is reciprocable in a vertical path and includes a transfer table to receive layers of articles one at a time from the top of a pile of layers which are superimposed on a pallet and have separating elements disposed therebetween. The transfer head is lowered or raised, as appropriate, relative to the pallet and a layer-receiving surface first to align the transfer table with the top layer of the pile and then with the layer-receiving surface. Transfer means associated with the transfer head moves the top layer first on to the transfer table and then on to the layer-receiving surface. The invention resides in the provision of pairs of opposed clamp members which are movable with the transfer head and relative thereto and one to the other and which are operated independently to engage the sides of the layer next below the top layer before the top layer is removed by the transfer means. Gripper means are also provided to grip a separating pad and hold it during removal of a layer from the pad by the transfer means.

9 Claims, 9 Drawing Figures

DEPALLETIZING APPARATUS

BACKGROUND OF THE INVENTION

1. Field of the Invention

The invention relates to apparatus for depalletizing layers of articles, one layer at a time, from a pile of superimposed layers which have separating elements positioned therebetween and which are carried by a pallet resting on a support therefor and for transferring the layers from the separating elements on to a layer-receiving surface located at a predetermined height from the ground.

2. Description of the Prior Art

The invention is concerned with depalletizing apparatus of the kind which comprises a transfer head reciprocable in a vertical path and including a transfer table to receive layers one at a time from the top of the pile, means operable to lower or raise, as appropriate, the transfer head relative to the pallet support and the layer-receiving surface thereby first to align the transfer table with the top layer of the pile and then to align the transfer table with the layer-receiving surface, transfer means associated with the transfer head and operable to move the top layer from the pile on to the transfer table and then to move the layer from the transfer table on to the layer-receiving surface, and operating means operable to reciprocate the transfer means lengthwise of the transfer table.

SUMMARY

It is desirable that while the top layer is being removed from the pile the next lower layer be constrained against movement irrespective of whether or not it is slightly out of vertical alignment with the other layers of the pile and it is an object of the invention to provide means adapted to this purpose.

According to the invention there is provided apparatus of the kind referred to above which includes pairs of opposed clamp members movable with the transfer head and relative thereto and one to the other, and clamp member actuating means operable when the transfer means is aligned with the top layer of the pile preparatory to effecting movement of the top layer on to the transfer table to actuate the clamp members independently to engage the sides of the layer next below the top layer in a manner such that, irrespective of the position of alignment of said next lower layer in relation to the other layers of the pile, said next lower layer is gripped between the clamp members in the position at which it is presented for engagement by the clamp members and is stabilised in that position during movement of the top layer on to the transfer table by the transfer means.

When the separating elements consist of pads there is a tendency for a pad supporting the top layer to be displaced during movement of the layer from the pad on to the transfer table and it is a further object of the invention to provide the apparatus with means for restraining the pad while the layer is being removed therefrom.

With this object in mind the apparatus includes gripper means movable with the transfer head and comprising a fixed gripper and a movable gripper, and gripper means actuating means operable when the transfer means is aligned with the top layer of the pile preparatory to effecting movement of the top layer on to the transfer table to actuate the movable gripper to grip and hold between the grippers a pad supporting the top layer while the top layer is moved by the transfer means from the pad on to the transfer table.

DESCRIPTION OF THE PREFERRED EMBODIMENT

Referring to the drawings, layers 1 of articles, for example upright bottles, are superimposed and loaded as a pile on a pallet 2. Separating elements, such as pads or inverted trays not shown, are positioned between the layers 1. The layers are to be transferred one at a time, starting at the top of the pile, to a receiving surface 3 which is located at a fixed predetermined height from the ground. The surface 3 may be that of a conveyor.

The depalletizing apparatus comprises a self-supporting and free-standing frame 4 which includes a support 5 for a loaded pallet 2, which may be placed on the support 5 by a fork-lift truck, and an elongate transfer head 6 which is supported for movement lengthwise of and between vertical frame elements 7 which extend upwards from the support 5. The transfer head 6 is provided with rollers 8 which run on the frame elements 7, and up-and-down movements of the transfer head 6 are effected by an electric chain- or cable-hoist 9, which may be of the kind known as DEMAG, controlled by a control means 10. The hoist is a two-speed hoist and is provided with a brake not shown.

Figure 3:
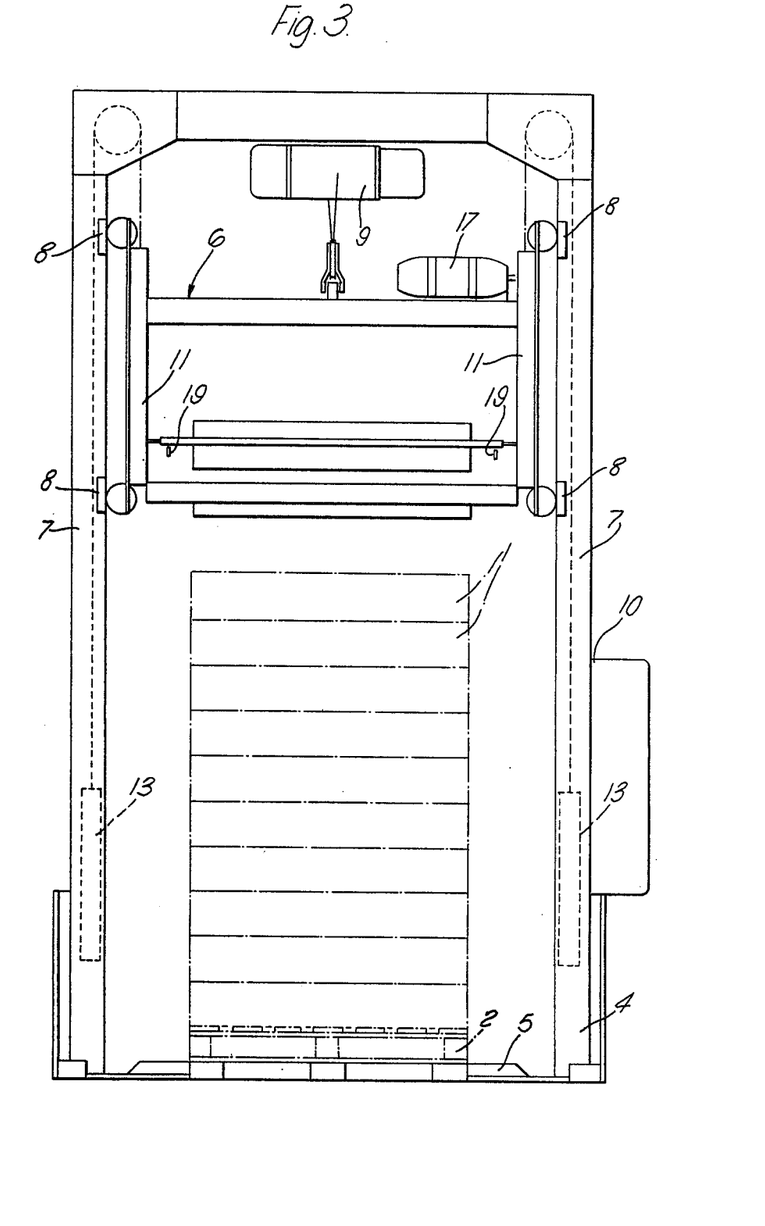
FIG. 3 is a diagrammatic side elevation of FIG. 1.

The transfer head 6 includes side members 11 which at one end of the head permit the passage therebetween of the layers 1 of the loaded pallet on the support 5 during movement of the transfer head 6 lengthwise of the frame elements 7 which are hollow and are engaged by the roller 8 which run on the facing surfaces of the frame elements 7, FIG. 3. Counterweights 13 are housed in the frame elements 7. The opposite end of the transfer head 6 is provided with a transfer table 14, FIG. 4, which is to receive a layer 1 in preparation for the transfer thereof to the surface 3.

Figure 1:
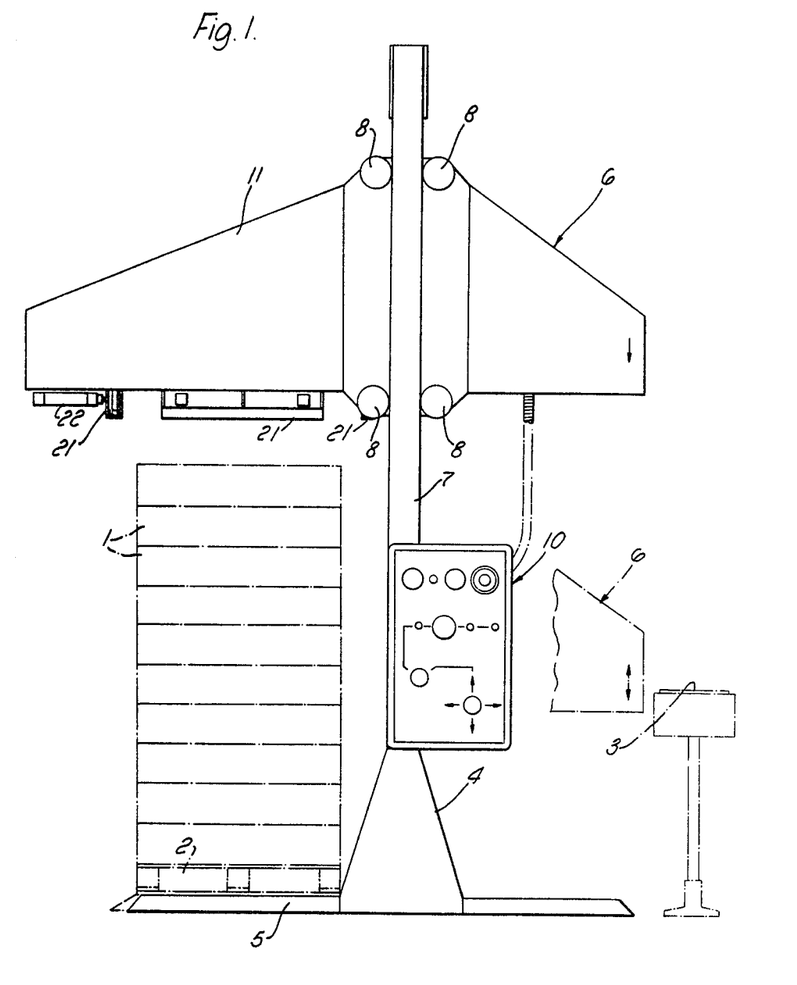
FIG. 1 is a diagrammatic side elevation of apparatus according to the invention.
Figure 2:
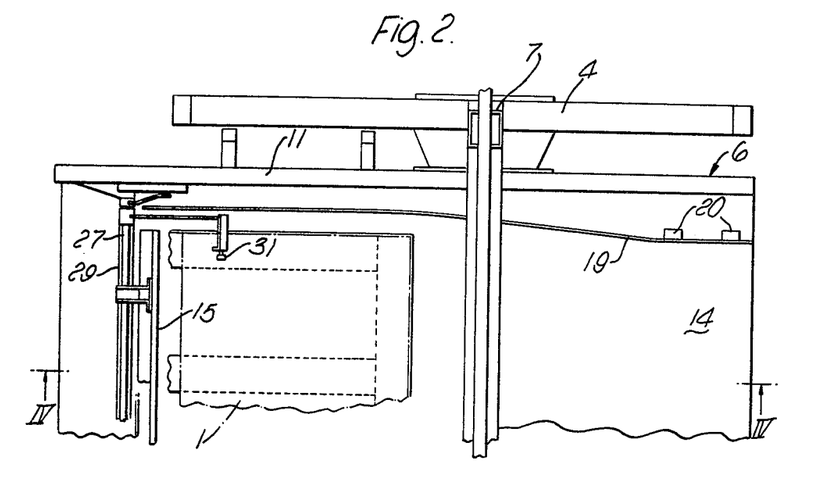
FIG. 2 is a diagrammatic top plan of a part of FIG. 1.
Figure 5:
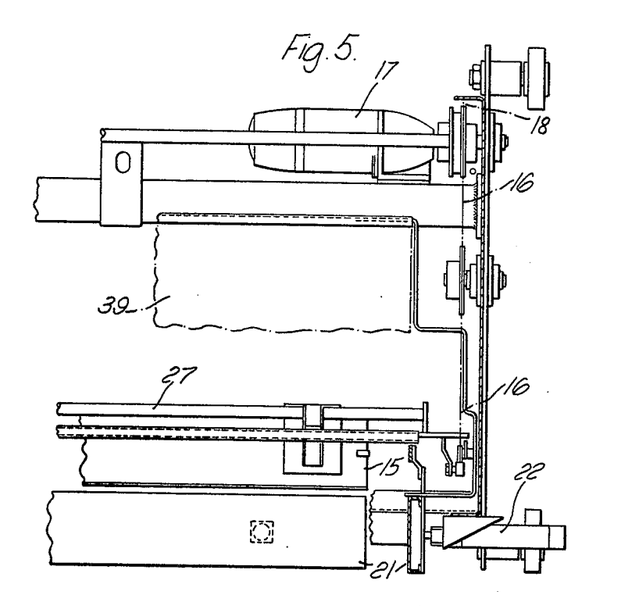
FIG. 5 is a part section on line V—V, FIG. 4.
Figure 6:
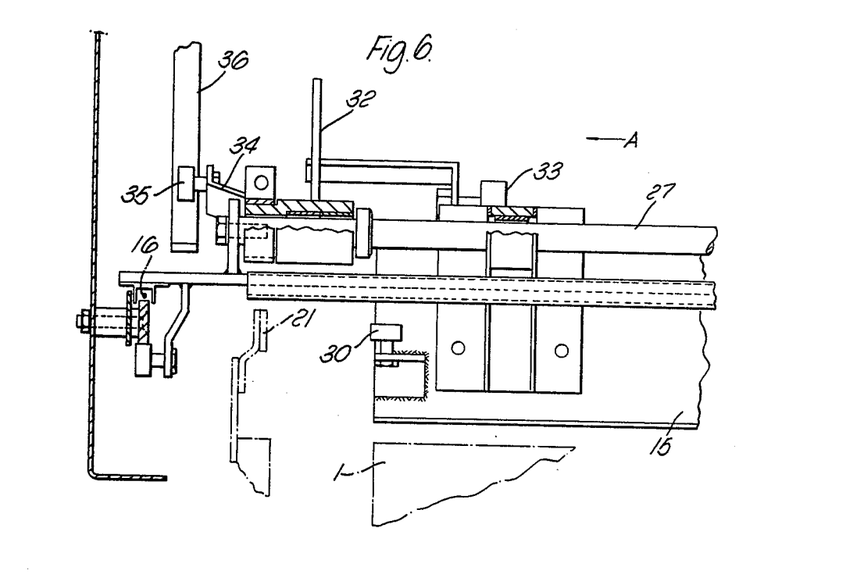
FIG. 6 is a part end elevation, partly in section.

Transfer means, shown as a sweep member 15, is arranged when the transfer table 14 is aligned with the bottom of the top layer to move the top layer on to the transfer table 14. The sweep member is carried by chains 16 driven by a motor 17, FIGS. 3 and 5, and chain 18, FIG. 5, controlled by the control means 10. The motor 17 may also be of the kind known as DEMAG and is a two-speed motor provided with a brake not shown. The transfer head 6 is also provided with self-aligning guides 19, FIG. 3, which have the forward ends thereof anchored to the transfer head, as at 20, FIG. 2, only one of the guides being shown. The layers are guided between the guides 19 while being moved on to the transfer table 14.

Figure 4:
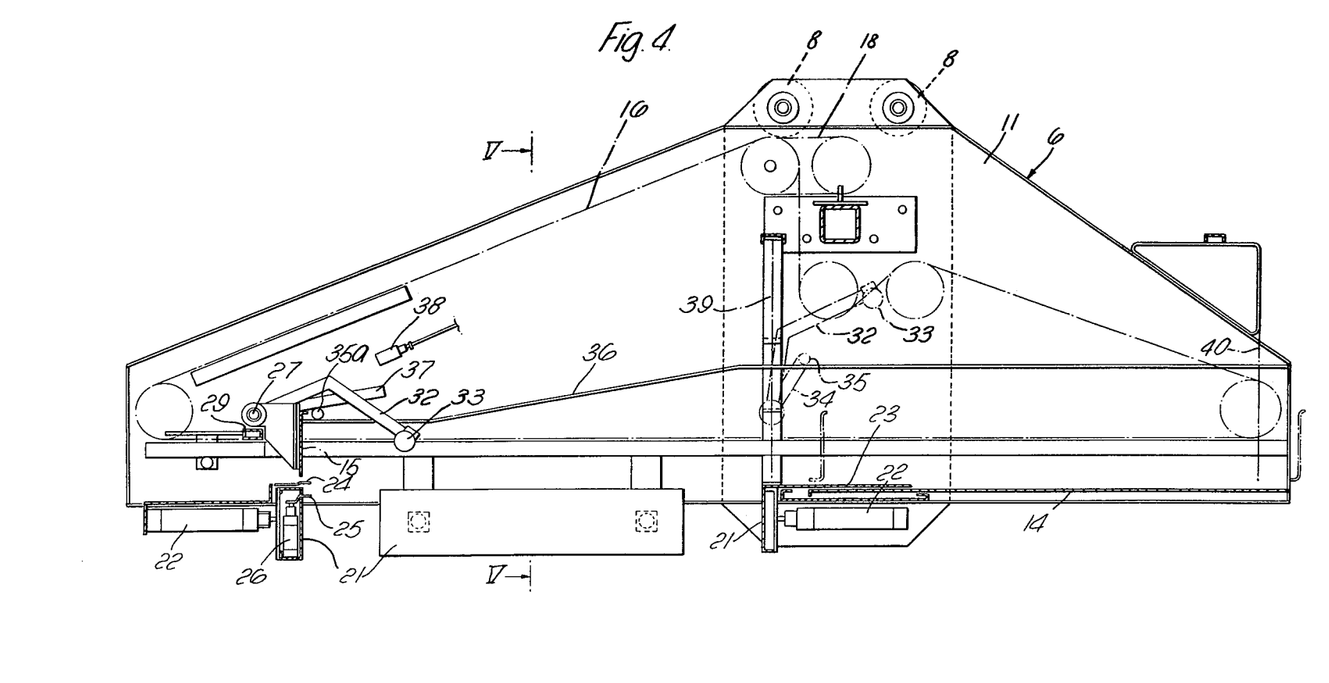
FIG. 4 is a section on line IV—IV, FIG. 2, through the transfer head of the apparatus.

The transfer head is provided with pairs of opposed clamp members 21 which are movable with the transfer head and relative thereto and one of the other and clamp member actuating means, shown as pneumatic cylinders 22, are operable when the transfer means, that is the sweep member 15, is aligned with the top layer of the pile, FIG. 4, preparatory to effecting movement of the top layer on to the transfer table 14. The pneumatic cylinders 22 are double-acting and are operated independently one of the other so that as they engage the sides of the layer next below the top layer they individually cease to operate. By this means the opposite sides and opposite ends of the layer next below the top layer are clamped between the clamp members 21 in a manner such that, irrespective of the position of alignment of the said next lower layer in relation to the other layers of the pile the next lower layer is gripped between the clamp members 21 in the position at which it is presented for engagement by the clamp members and is stabilised in that position during movement of the top layer on to the transfer table 14 by the sweep member 15. The front clamp member is provided with a deadplate 23, FIG. 4, which ensures a smooth transfer of top layer on to the transfer table 14.

When the layers 1 are separated by pads the transfer head 6 is provided with gripper means, consisting of a fixed gripper 24 and a movable gripper 25. The gripper means are movable with the transfer head and gripper means actuating means shown as a pneumatic cylinder 26 is operable when the sweep member 15 is aligned with the top layer of the pile preparatory to effecting movement of the top layer on to the transfer table 14 to actuate the movable gripper 25 to grip and hold between the grippers 24, 25 the pad supporting the top layer while the top layer is moved by the sweep member 15 on to the transfer table 14.

Figure 8:
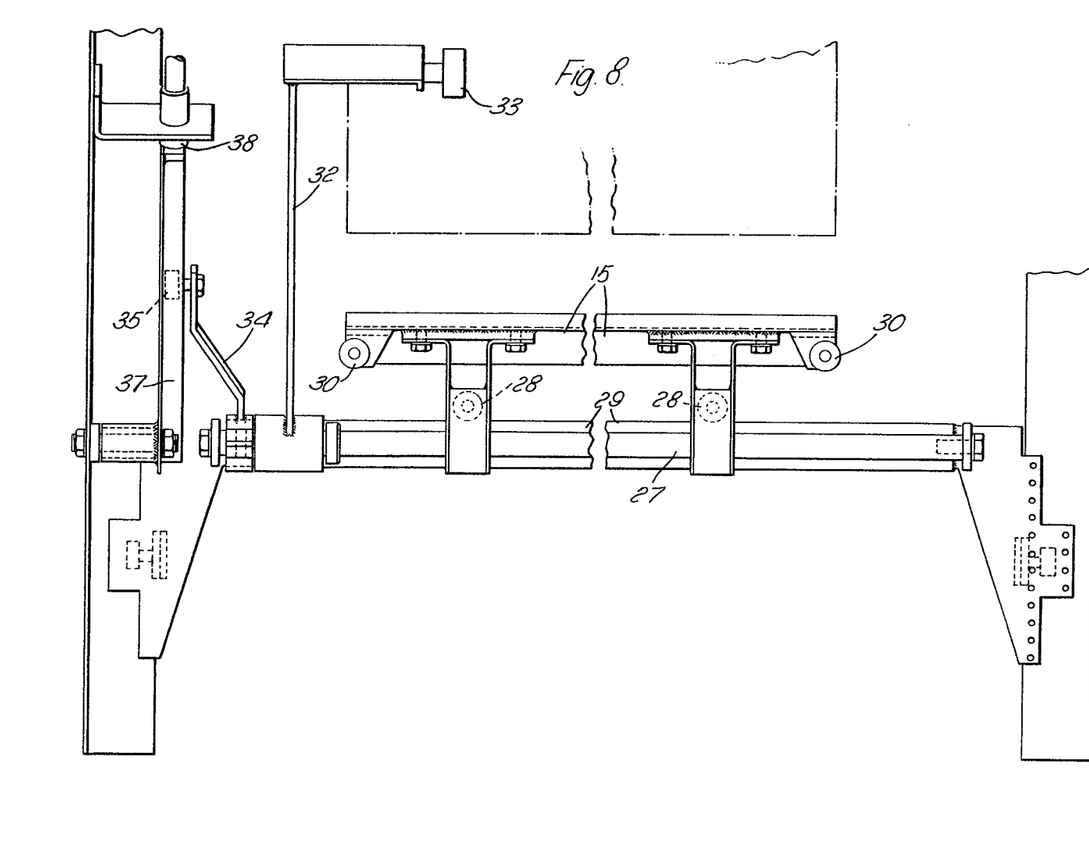
FIG. 8 is an end view illustrating the sweep member and index arm.

The sweep member 15 is supported by a shaft 27, transverse to and mounted for reciprocation lengthwise of the transfer table 14 by the chains 16. The sweep member is angularly movable with and freely movable axially of the shaft 27, being guided by rollers 28, FIG. 8, which run on a guide rail 29. Preparatory to a sweeping movement, the sweep member 15 is located relative to the top layer and the guides by the engagement of rollers 30 carried by the sweep member with the side clamping members 19, that is the clamping members 19 which engage those sides of the next lower layer which extend lengthwise of the transfer table 14.

The control means 10 includes electrical or electronic means and a memory for controlling the automatic functions of the apparatus, and height index controls which provide automatic height indexing in two stages, first to stop the transfer head 6 level with the top layer 1 of the pile, and second to stop the transfer head 6 at the correct level for transfer of a layer from the transfer table 14 to the layer-receiving surface 3. For indexing to stop the transfer head level with the top layer there is provided an index arm 32 which is freely rockable about the shaft 27 and which carries a roller 33 to engage the top of the top layer of the pile. An elevator arm 34 is movable with the index arm 32 and carries a cam follower 35 which is engaged with a cam track 36 during movement of the sweep member 15 towards the layer-receiving surface 3 to raise the index arm 32 out of engagement with the layer being moved by the sweep member 15. An operating arm 37 is pivotally mounted on the transfer head and is movable by the elevator arm 34 to actuate a proximity switch 38 to initiate, through the control means 10, operation of the clamp member operating cylinders 22 and the motor 17. A fixed stop 35a is engageable by the elevator arm to determine the lowermost position of the index arm 32.

For indexing the transfer head to the discharge or transfer level a duplex proximity head detection unit, not shown, is fitted to the transfer head and is actuated by "targets", not shown, fitted to the conveyor 3. One of such targets serves to provide a levelling signal for discharge or transfer and another provides a signal to the memory circuits, FIG. 9 of the control system in order that the tranfer head may travel in the correct direction, either upward or downward, after the transfer of a layer to the layer-receiving surface 3.

To prevent toppling of leading articles of a layer during movement of the layer to the position at which it is positioned on the transfer table 14 for transfer to the layer-receiving surface 3, the transfer head is provided with two hanging curtains 39, 40 shown diagrammatically in FIG. 4, each of which is slit vertically into a series of "fingers". The curtain 39 is retractable and is pneumatically operable, by means not shown, to be withdrawn when the transfer head is descending round the top layer of the pile so as to provide an adequate clearance for the passage of the transfer head about the top layer.

Figure 9:
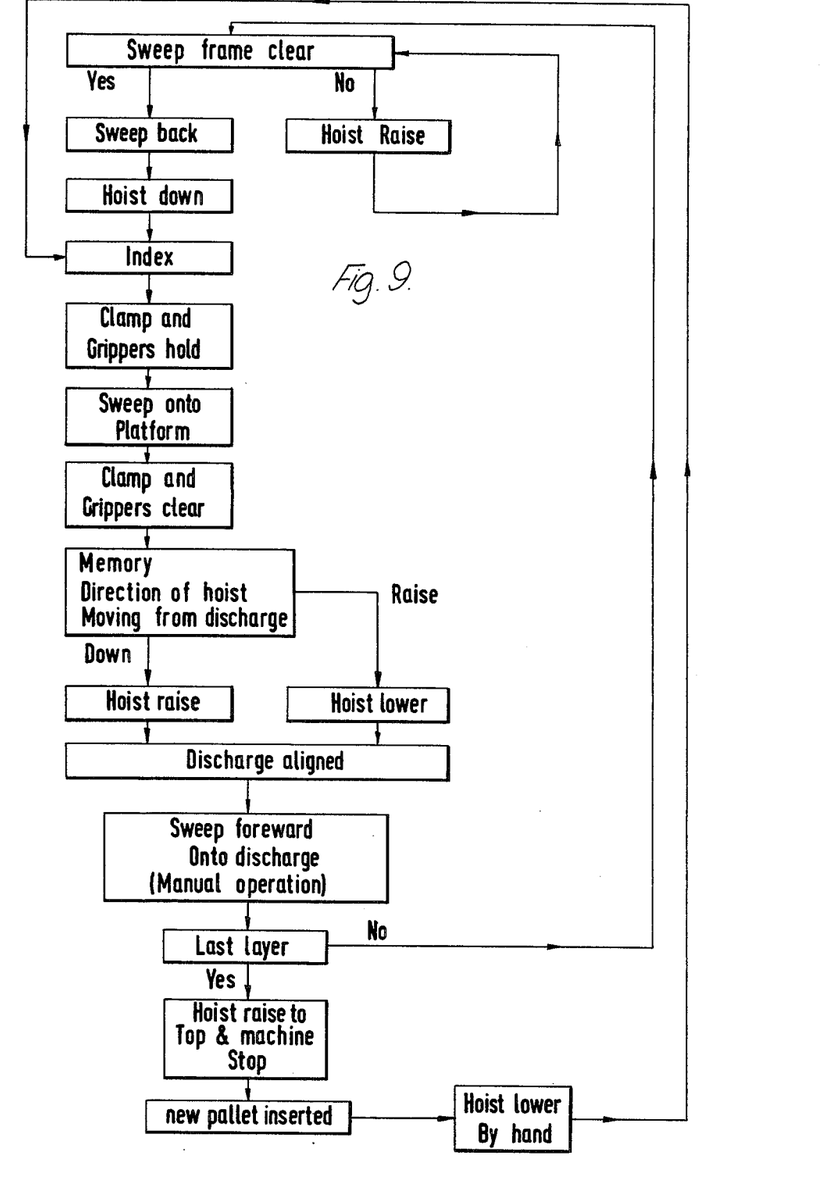
FIG. 9 illustrates the sequence of operations of the apparatus as controlled by control means embodied in the apparatus.

The sequence of operation of the apparatus, shown in FIG. 9 is as follows:

A loaded pallet is positioned on the support 5 and the transfer head 6 is then lowered under direct operator control and the first height index is made by index arm 32. The apparatus then, through proximity switch 38, goes into automatic cycle with the clamp members 21 being moved inwards to clamp the layer next below the top layer, and the grippers 24, 25, when the layers are separated by pads, gripping the pad on which the top layer rests. The sweep member 15 positions itself axially of shaft 27 and the curtain 39 moves into position.

Figure 7:
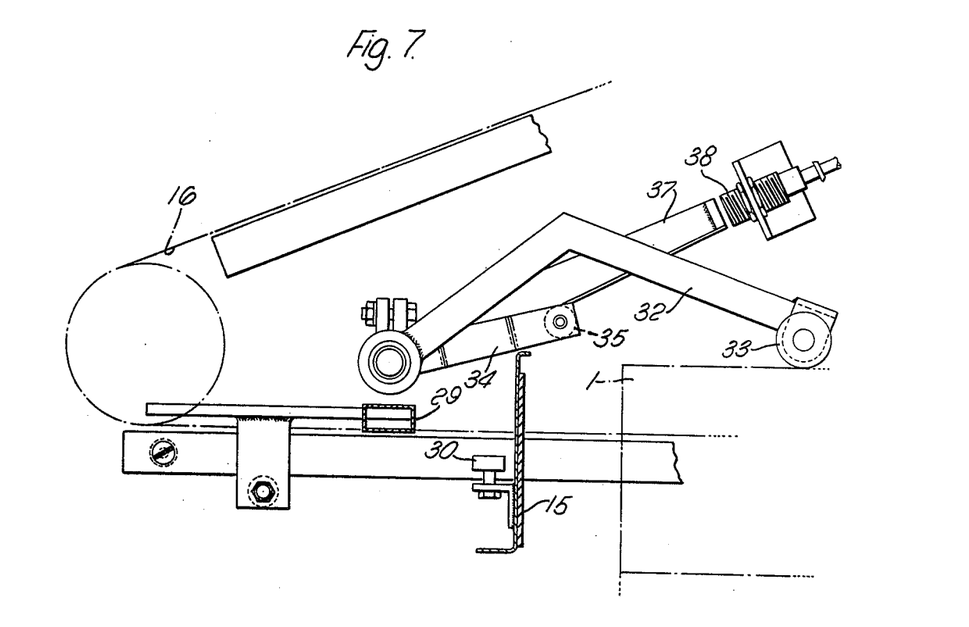
FIG. 7 illustrates the index arm and associated parts.

The sweep member 15 then moves forward from the rest position, full line position, FIG. 7, engages the top layer and moves it on to the transfer table 14, broken line position, FIG. 4. On completion of this movement of the sweep member 15 the clamp members 21, the grippers 24, 25, if used, and the guides 19 move out, and curtain 39 moves back. The transfer head 6 then lowers and stops when the transfer table 14 is aligned with the layer-receiving surface 3.

The automatic operation then ceases and the operator removes the layer from the transfer table 14 on to the surface 3 by controlling movement of the sweep member 15 by a joystick, not shown, provided on the control means 10, first ensuring that sufficient space is available on the surface 3.

The operator removes the inverted tray, if used, or the pad from the top of the transferred layer as the pad, when used, is, after the first layer, carried with each layer as it is removed from the top of the pile.

On completion of the full stroke of the sweep member 15 the automatic cycle is resumed and the transfer head 6 is raised to a position above the pile on the pallet, the sweep member 15 being restored to the rest position only when the transfer head 6 has been moved above the top of the pile.

The cycle just described is repeated until all of the layers have been removed from the pallet after which the transfer head 6 returns to the uppermost position thereof where it remains until the programme is again initiated by the operator.

When the level of the pile has been reduced so that it is below the level of the surface 3 the transfer head 6 is first lowered to pick up the top layer and is then raised to the level of the surface 3 for the transfer of a layer. This facility is provided automatically by the memory circuits of the control means.

I claim:

1. In apparatus for transferring layers of articles, one layer at a time, from a pile of superimposed layers, of the kind comprising a bottom support for a pile of layers of articles; a transfer head positioned above said bottom support, which transfer head includes a transfer table; and support means for said transfer head including means for lowering and raising said transfer head relative to said bottom support first to align the transfer table with the top layer of the pile and then to align the transfer table with a layer-receiving means; the improvement wherein said transfer head includes:

transfer means for engaging the top layer of the pile;
operating means connected to the transfer means for reciprocating said transfer means lengthwise said transfer table to move the top layer of the pile on to the transfer table and to move a layer from said transfer table on to said layer-receiving means;
opposed clamp members arranged for engaging the sides of a lower layer immediately below the top layer when said transfer means is aligned with the top layer, to clamp said lower layer preparatory to moving the top layer on to the transfer table; and
individual actuating means for each of said clamp members, each operable to move its clamp member inwardly only until that clamp member engages said next lower layer irrespective of the position of alignment of said next lower layer in the pile, whereby said next lower layer is stabilized in the position in which it is presented in the pile during movement of the top layer on to said transfer table by said transfer means.

2. Apparatus according to claim 1, wherein said transfer means comprises a sweep member for engaging the top layer of the pile, a shaft transverse to and mounted for reciprocation lengthwise of the transfer table by said operating means, means for mounting the sweep member on the shaft so that the sweep member is freely movable axially of the shaft, locating means on said sweep member for engaging a pair of said clamp members which extend lengthwise of the transfer table to locate the sweep member axially on said shaft in alignment with the transfer table.

3. Apparatus according to claim 2, including gripper means mounted on the transfer head and comprising a fixed gripper and a movable gripper, and gripper means actuating means operable when the transfer means is aligned with the top layer of the pile, preparatory to effecting movement of the top layer on to the transfer table, to actuate the movable gripper to grip and hold between the grippers a pad separating the top layer from the next lower layer while the top layer is moved by the transfer means from the pad on to the transfer table.

4. Apparatus according to claim 3, including an index arm pivotally mounted on the transfer head, said arm being arranged to engage the top of the top layer of the pile, an elevator arm movable with the index arm and carrying a cam follower engageable with a cam track during movement of the transfer means towards said layer-receiving means to raise the index arm out of engagement with the layer being moved by the transfer means from the transfer table to the layer-receiving means, an operating arm pivotally mounted on the transfer head and movable by the elevator arm to actuate a switch to initiate operation of the clamp member actuating means and said operating means, and a fixed stop engageable by the elevator arm to determine the lowermost position of the index arm.

5. Apparatus according to claim 1, including gripper means mounted on the transfer head and comprising a fixed gripper and a movable gripper, and gripper means actuating means operable when the transfer means is aligned with the top layer of the pile, preparatory to affecting movement of the top layer on to the transfer table, to actuate the movable gripper to grip and hold between the grippers a pad separating the top layer from the next lower layer while the top layer is moved by the transfer means from the pad on to the transfer table.

6. Apparatus according to claim 1, including an index arm pivotally mounted on the transfer head, said arm being arranged to engage the top of the top layer of the pile, an elevator arm movable with the index arm and carrying a cam follower engageable with a cam track during movement of the transfer means towards said layer-receiving means to raise the index arm out of engagement with the layer being moved by the transfer means from the transfer table to the layer-receiving means, an operating arm pivotally mounted on the transfer head and movable by the elevator arm to actuate a switch to initiate operation of the clamp member actuating means and said operating means, and a fixed stop engageable by the elevator arm to determine the lowermost position of the index arm.

7. Apparatus according to claim 6, wherein said transfer means comprises a sweep member for engaging the top layer of the pile, a shaft transverse to and mounted for reciprocation lengthwise of the transfer table by said operating means, means for mounting the sweep member on the shaft so that the sweep member is freely movable axially of the shaft, locating means on said sweep member for engaging a pair of said clamp members which extend lengthwise of the transfer table to locate the sweep member axially on said shaft in alignment with the transfer table and wherein the index arm is freely rockable about said shaft.

8. Apparatus for transferring layers of articles, one layer at a time, from a pile of superimposed layers, comprising:

a bottom support for a pile of layers of articles;
a transfer head positioned above said bottom support, and including
a transfer table,
a sweep member for engaging the top layer of the pile of layers,
a shaft transverse to and mounted for reciprocation lengthwise of the transfer table,
means for mounting the sweep member on the shaft so that the sweep member is freely movable axially of the shaft,
operating means connected to said shaft for reciprocating said sweep member lengthwise of said transfer table,
pairs of opposed clamp members arranged for engaging the sides of the next lower layer of articles below the top layer when the sweep member is aligned with the top layer,
individual actuating means for each of said clamp members, each operable to move its clamp member inwardly only until that clamp member engages said next lower layer irrespective of the position of alignment of said next lower layer in the pile to stabilize said next lower layer in the position in which it is presented in the pile during operation of said sweep member, and locating means on said sweep member for engaging the pair of clamp members which extend lengthwise of the transfer table to locate the sweep member axially on said shaft in alignment with the transfer table; and support means for said transfer head including means for lowering and raising said transfer head relative to said bottom support to first align the transfer table with the top layer of the pile preparatory to transfer of said top layer to the transfer table by the sweep member, and then to align the transfer table with layer-receiving means preparatory to transfer of a layer from said table to said receiving means by the sweep member.

9. Apparatus for transferring layers of articles, one layer at a time, from a pile of superimposed layers which are separated by pads, comprising:

a bottom support for a pile of layers of articles;

a transfer head positioned above said bottom support and including;

a transfer table, transfer means for engaging the top layer of the pile, operating means connected to said transfer means for reciprocating said transfer means lengthwise of said transfer table to move the top layer of the pile of layers on to the transfer table and to move a layer from said transfer table on to a layer-receiving means, opposed clamp members arranged for engaging the sides of the lower layer below the top layer when said transfer means is aligned with the top layer, to clamp said lower layer preparatory to moving the top layer on to the transfer table, individual actuating means for each of said opposed clamp members, each operable to move its respective clamp member inwardly only until that clamp member engages said next lower layer irrespective of the position of alignment of said next lower layer in the pile, and gripper means including a fixed gripper, a movable gripper, and actuating means for said movable gripper, which grippers are so located with respect to said transfer means as to engage and grip when actuated a pad separating the top layer of articles from the next lower layer whereby the pad is held while the top layer is transferred therefrom by the transfer means; and support means for said transfer head including means for lowering and raising said transfer head relative to said bottom support to first align the transfer table with the top layer of the pile preparatory to transfer of said top layer to the transfer table by said transfer means, and then to align the transfer table with the layer-receiving means preparatory to transfer of a layer from the table to said receiving means by said transfer means.

* * * * *